US005916504A

United States Patent [19]

Edwards, Jr. et al.

[11] Patent Number: 5,916,504

[45] Date of Patent: Jun. 29, 1999

[54] METHOD FOR FORMING A TEST SPECIMEN FROM A MIXTURE OF ASPHALT CONCRETE

[75] Inventors: M. Earl Edwards, Jr., Trenton, Ga.; Herbert E. Jakob, Chattanooga, Tenn.

[73] Assignee: Pavement Technology, Inc., Chattanooga, Tenn.

[21] Appl. No.: 08/888,602

[22] Filed: Jul. 7, 1997

[51] Int. Cl.[6] .............................. B28B 1/087; B28B 3/02; B28B 7/38; B29C 43/02

[52] U.S. Cl. ............................ 264/71; 264/333; 264/338; 264/DIG. 65

[58] Field of Search ............................... 264/71, 70, 219, 264/333, 338, DIG. 65

[56] References Cited

U.S. PATENT DOCUMENTS

| | | | |
|---|---|---|---|
| 2,644,220 | 7/1953 | Thaulow | 264/71 |
| 2,972,249 | 2/1961 | McRae et al. | 73/88 |
| 3,478,572 | 11/1969 | McRae et al. | 73/9 |
| 3,555,605 | 1/1971 | Angelotti et al. | 264/71 |
| 3,764,242 | 10/1973 | Fischer | 264/71 |
| 4,238,177 | 12/1980 | Crile et al. | 264/71 |
| 4,698,010 | 10/1987 | Toncelli | 264/71 |
| 4,942,768 | 7/1990 | McRae | 73/795 |
| 5,036,709 | 8/1991 | McRae | 73/841 |
| 5,783,230 | 7/1998 | Toet et al. | 264/71 |
| 5,800,752 | 9/1998 | Charlebois | 264/71 |

OTHER PUBLICATIONS

"EDCO® Gyratory Testing Machine (GTM)" taken from Oct. 1995 issue of Asphalt Contractor, p. 78.

"Fatigue Testing of Asphaltic Concrete Slabs" by R. A. Jimenez, pp. 3–17. (No Date).

"Evolution of the Hveem Stabilometer Method of Designing Asphalt Paving Mixtures" by B. A. Vallerga and W. R. Lovering, pp. 243–303. (No Date).

"Control of Field Density of Bituminous Concrete with a Gyratory Compactor" by F. W. Kimble and W. B. Gibboney, pp. 1–55. (No Date).

"Gyratory Testing Machine Procedures for Selecting the Design Asphalt Content of Paving Mixtures" by B. F. Kallas, pp. 341–362. (No Date).

"A New Vibrating Machine for Determining the Compactibility of Aggregates" by J. T. Pauls and J. F. Goode of the U.S. Bureau of Public Roads, pp. 124–145. (No Date).

"Triaxial Testing and The Triaxial Institute" by V. A. Endersby, Chariman of The Triaxial Institute. (No Date).

"Application of the Triaxial Test to Bituminous Mixtures—Hveem Stabilometer Method" by F. N. Hveem, State of California, Jul. 7, 1949.

"Preliminary Report of an Apparartus for the Testing of Asphaltic Concrete Diaphragms" by Rudolf A. Jimenez and Bob M. Gallaway, pp. 477–506. (No Date).

"U.S. Corps of Engineers Gyratory Testing Machines", pp. c–35 & C–36. (No Date).

*Primary Examiner*—Karen Aftergut
*Attorney, Agent, or Firm*—Chambliss, Bahner & Stophel, P.C.

[57] ABSTRACT

A method for forming a test specimen from an asphalt concrete mixture includes providing a mold to receive a quantity of the mixture and adding a predetermined quantity of the mixture to the mold. The mixture in the mold is compressed at a pressure of at least about 7 psi while vibrating the mixture in the mold at a rate of at least about 2400 cycles per minute. The method also includes maintaining the vibration of and the application of compressing pressure to the mixture in the mold until the mixture obtains a predetermined mix design density within a range of about 90–97%.

15 Claims, 7 Drawing Sheets

METHOD FOR FORMING A TEST SPECIMEN FROM A MIXTURE OF ASPHALT CONCRETE

FIELD OF THE INVENTION

The invention relates to methods and apparatus for sample preparation, and more particularly to a method and apparatus for forming compacted test specimens of asphalt concrete mixtures or compositions. The machine may therefore be used to prepare samples that may be tested to predict the durability, serviceability and overall suitability of such compositions for use in roadway construction.

BACKGROUND OF THE INVENTION

The durability and service performance of an asphalt roadway can be affected by a number of variables, including the asphalt mix composition that is used, the construction techniques employed in building the roadway, the overall weight, axle weight and tire size of the vehicles using the roadway, the number and speed of the vehicles and the temperature and other environmental factors under which the roadway is used. Most of these various factors are beyond the control of the road designer. Furthermore, as traffic has increased on the nation's highways and as high-pressure radial tires have become more commonly used on heavy trucks, wear and even deterioration of the roadways has accelerated. Such wear and deterioration may be evidenced by rutting, stripping and/or fatigue cracking of the asphalt concrete roadway, which will reduce the service life of the roadway, as well as the comfort of the drivers and passengers in the vehicles using the roadway. In addition, rutting may also contribute to safety hazards that may arise from an accumulation of water in the rutting paths. Such accumulation may lead to hydroplaning, or in appropriate weather conditions, icing.

The ability to predict such undesirable performance characteristics as rutting, stripping and fatigue cracking from a sample of a particular asphalt paving composition can lead to the development of improved and longer-lasting paving compositions. Consequently, methods and apparatus for use in predicting such tendencies in various asphalt compositions have assumed increasing importance and emphasis. Applicants themselves have developed methods and a preferred apparatus for testing pavement samples in order to predict the performance characteristics of particular asphalt concrete compositions, and such methods and apparatus are described in their U.S. patent application Ser. No. 08/689,602, which is entitled "Testing Machine For Pavement Samples" now U.S. Pat. No. 5,659,140. However, the validity of all of these methods and apparatus for testing asphalt pavement samples depends to a large extent on the nature of the samples which are tested and the degree to which the tests simulate actual conditions encountered by asphalt concrete pavement surfaces. Consequently, the degree to which the samples are representative of paving material in roadways, considering the methods and equipment employed in modern road construction, is very important.

Since the 1940s, most asphalt concrete mixtures used in paving in the United States have been designed according to either the Hveem or the Marshall mixture design criteria. Francis Hveem of the California Division of Highways developed the methodology that bears his name beginning in the late 1930s, and at about the same time, the Marshall mix design method was developed at the Mississippi Highway Department by Bruce Marshall.

During the late 1930s and 1940s, several new laboratory tests were developed by which samples of asphalt concrete mixtures prepared according to these methods could be tested to predict how such mix designs would perform under actual traffic and environmental conditions. Originally, these laboratory samples were prepared by a static loading or impact loading method. According to the static loading method, a quantity of asphalt concrete of a particular mix design was placed in a mold, and a static compressive force was applied to the mixture in the mold. In the impact loading method, a weighted hammer was used to apply repeated impact loads to the mixture in a mold. Usually, the mixture in the mold was compacted under repeated hammer blows applied first on one side and then on the other side of the mold. Different drop hammer weights or compressive loads were considered, as well as different numbers of blows per side, different hammer or compactor shapes and different mold shapes and constructions. Hveem continued to experiment in this area, as did the Triaxial Institute, a Project Committee of the American Society For Testing Materials (ASTM). Some of Hveem's later conclusions are reported in a report entitled "Application of the Triaxial Test to Bituminous Mixtures—Hveem Stabilometer Method", which was released bearing a date of Jul. 7, 1949. In addition, some of the findings of the Triaxial Institute were reported by its chairman, V. A. Endersby, in an undated paper entitled "Triaxial Testing and the Triaxial Institute".

These published findings of Hveem and the Triaxial Institute suggest that specimens of asphalt concrete prepared by a static loading or an impact loading method do not resemble actual road surfaces, because the structural alignment of the aggregate particles in a sample prepared by such methods is not comparable to the structural alignment of the aggregate particles in an actual roadway. It was theorized that rolling compaction and the rolling of vehicular tires under the load of a vehicle's weight impart a kneading action to the asphalt roadway which aligns the aggregate particles in the asphalt in a unique way, and that this unique alignment cannot be duplicated by static loading or impact loading methods. Consequently, Hveem developed a kneading compactor that employs a small tamper to sequentially compact adjacent areas of the upper surface of a sample of asphalt concrete mixture that is contained in a rotating mold.

Subsequently, a gyratory kneading compactor was developed, such as is described in U.S. Pat. No. 2,972,249 of McRae. According to this patent, an asphalt concrete mixture is placed within a mold and a compression plunger is utilized to apply a compression force to the upper surface of the mixture within the mold. As such force is applied, the mold is oscillated in a gyratory fashion without rotation. According to McRae, this apparatus applies the dual stresses of compression and distortion to the mixture, which together constitute kneading. This kneading, or distortion under compression, insures a frictional movement and realignment among the particles in the sample that is reportedly similar to that obtained under actual road conditions.

However, Applicants have determined that the known static loading, impact loading and gyratory compacting methods of sample preparation do not readily lend themselves to testing to predict the effects of environmental and traffic conditions on roadways constructed with a particular asphalt concrete mix designs according to modern road building techniques, especially those using vibratory compaction rollers.

It would be desirable, therefore, if a method and apparatus could be developed for preparing a test sample of an asphalt concrete mixture that would simulate the construction techniques employed in modern road building. It would also be desirable if such apparatus could be developed that would be simple and economical to operate.

OBJECTS AND ADVANTAGES OF THE INVENTION

Accordingly, it is an object of the invention claimed herein to provide a method and apparatus for preparing a test sample of an asphalt concrete mixture that simulates the construction techniques employed in modern road building. It is also an object of the invention to provide such an apparatus that is simple and economical to operate.

Additional objects and advantages of this invention will become apparent from an examination of the drawings and the ensuing description.

SUMMARY OF THE INVENTION

The invention includes a method and apparatus for forming a test specimen from an asphalt concrete mixture. According to the method, a mold is provided to receive a quantity of the mixture, and a predetermined quantity of the mixture is added to the mold. The mixture in the mold is compressed at a pressure of at least about 7 psi while vibrating the mixture in the mold at a rate of at least about 2400 cycles per minute. The vibration of the mixture in the mold and the application of compressing pressure thereto is maintained until the mixture obtains a predetermined mix design density within a range of about 90–97%.

In order to facilitate an understanding of the invention, the preferred embodiment of the invention is illustrated in the drawings, and a detailed description thereof follows. It is not intended, however, that the invention be limited to the particular embodiment described or to the particular apparatus illustrated herein. Various modifications and alternative embodiments such as would ordinarily occur to one skilled in the art to which the invention relates are also contemplated and included within the scope of the invention described herein.

BRIEF DESCRIPTION OF THE DRAWINGS

The presently preferred embodiment of the invention is illustrated in the accompanying drawings, in which like reference numerals represent like parts throughout, and in which.

DESCRIPTION OF THE PREFERRED EMBODIMENTS

Figure 1:
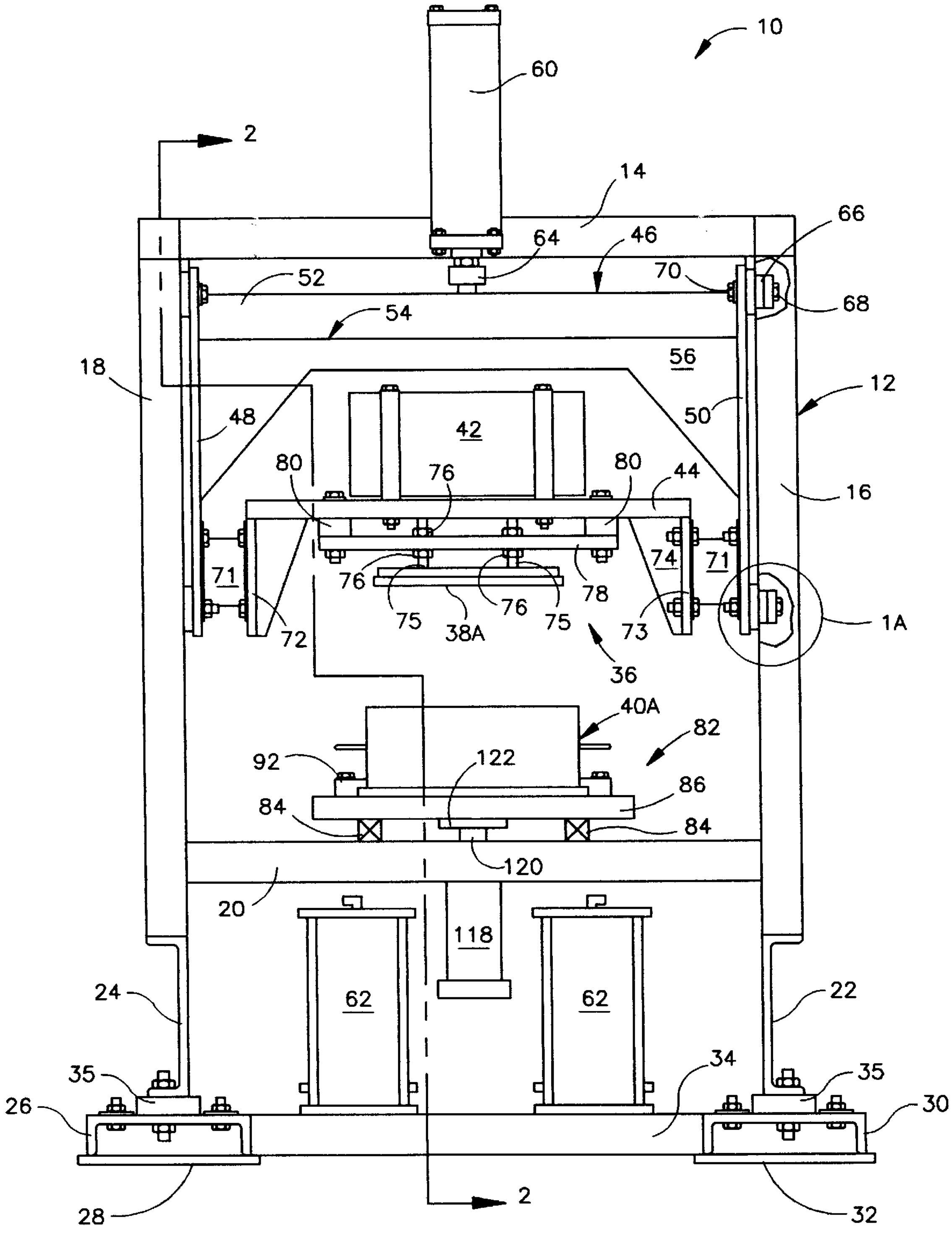
FIG. 1 is a plan view of a preferred apparatus that operates according to the claimed method.
Figure 2:
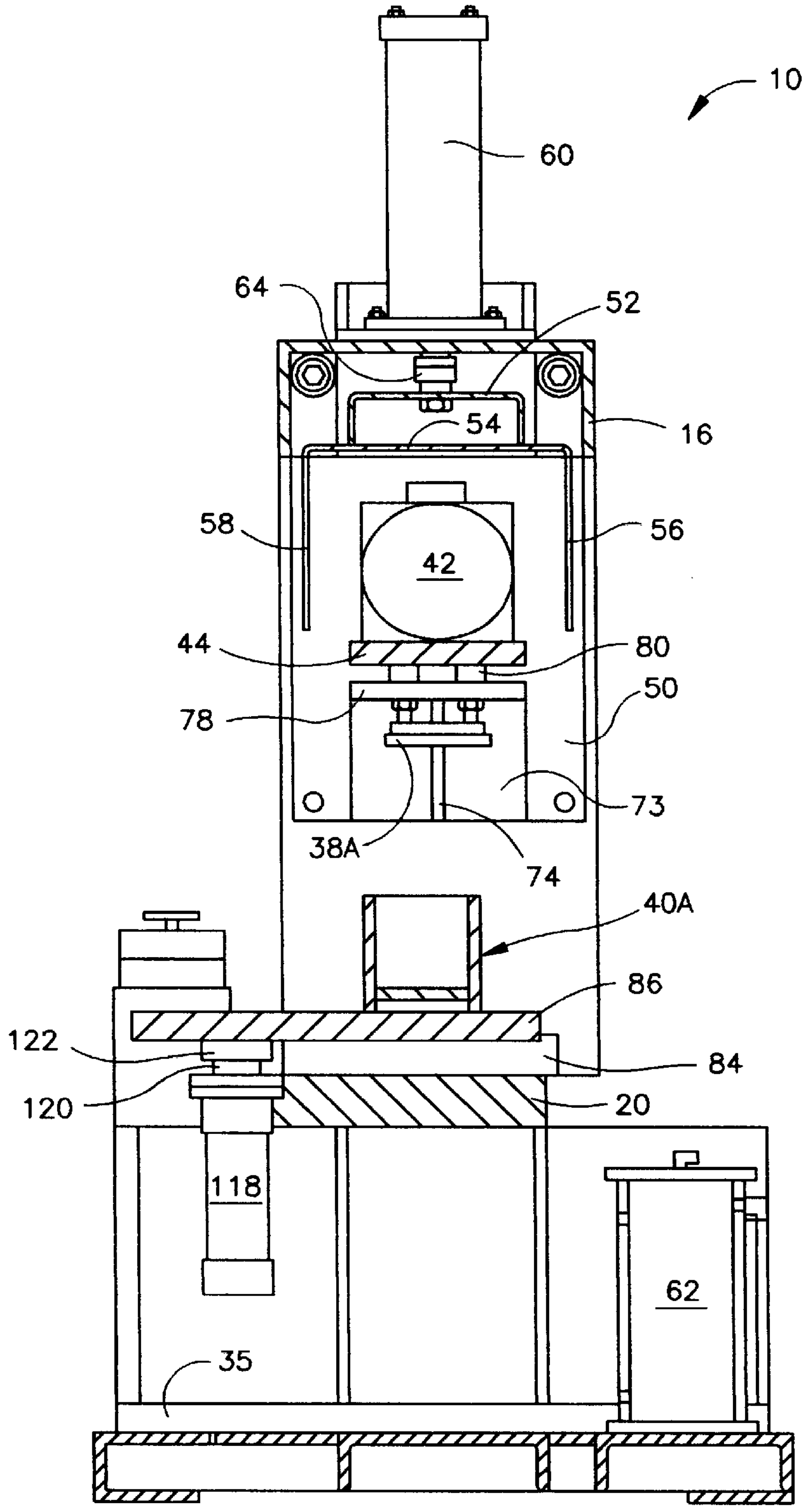
FIG. 2 is a sectional view of the apparatus of FIG. 1, taken along the line 2—2 of FIG. 1.

FIGS. 1 and 2 illustrate a preferred embodiment of the apparatus which may be operated according to the claimed method to compact samples of asphalt concrete mixtures or compositions for subsequent testing to permit prediction of the durability, serviceability and overall suitability of such compositions for use in roadway construction. Referring now to the drawings, apparatus 10 includes a frame 12 comprised primarily of a plurality of steel frame components that are welded, bolted or otherwise joined together, in the configuration illustrated, in a known fashion. Of course, the frame could be provided using other suitable materials joined together by other known means in any convenient configuration, so long as it is adapted to support the other components of the apparatus. As shown in FIGS. 1 and 2, frame 12 includes frame components 14, 16, 18, 20, 22 and 24, which are mounted on a base comprised of components 26, 28, 30, 32 and 34. Preferably, the frame components will be isolated from the base components by elastomeric pads 35. Such pads will tend to dampen vibrations created by the apparatus during vibration and compaction of the asphalt mix so that said vibrations will not be transmitted through the base components to the floor. Without a use of such elastomeric pads, the apparatus may exhibit a tendency to "walk" or "jump" on the floor surface, thereby potentially creating a safety hazard.

Components 16 and 18 of apparatus 10 are preferably provided in the form of channel components, in order to permit vertical movement of compaction assembly 36, as subsequently explained. Portions of channel component 16 are illustrated as having been broken away (in FIGS. 1 and 1A) in order to show some of the details of compaction assembly 36.

Compaction assembly 36 is supported by frame 12, and is adapted for movement from a raised or disengaged position (shown in FIG. 1) to a lowered position (not shown), in which a compaction head such as head 38A may be placed in contact with a mixture of asphalt concrete in a mold such as mold 40A. This compaction head is adapted to fit within the sidewalls of the mold body, so as to contact a quantity of the mixture in the mold. Compaction assembly 36 also includes vibrator 42 that is bolted or otherwise attached to base plate 44, and good results have been obtained with a use of a 2 hp vibrator having internal eccentrically-mounted rotating weights that is sold as the model 2P800 vibrator by Vibco Co., Inc. of Wyoming, R.I.

Compaction assembly 36 is mounted on carriage assembly 46, which includes carriage side rails 48 and 50, upper frame member 52, top plate 54, and front and back supports 56 and 58. The carriage assembly also includes eight roller assemblies that are located at the upper and lower ends and front and back sides of carriage side rails 48 and 50. These roller assemblies, which are mounted in rolling engagement with channel frame members 16 and 18, as best shown in FIGS. 1 and 1A, enable the compaction assembly 36 to be moved within the frame by the action of pneumatic cylinder 60, as further explained hereinafter.

Through the operation of compaction assembly 36, the compaction head may be moved downwardly from the position shown in FIG. 1 to contact the mixture in the mold and to apply a static compressive force to the mixture while the vibrator is operated to vibrate said mixture. Good results have been obtained when the pneumatic cylinder used is the model AS-MF1 cylinder having a 4" bore and a 12" stroke, that is manufactured and sold by AIR-DRO Company of Decatur, Ala. Cylinder 60 is preferably mounted onto frame member 14 and its actuator 64 is attached to upper frame member 52 of carriage assembly 46. Preferably, cylinder 60 is also operatively attached to one of the air-over-oil reservoirs 62 (two identical reservoirs 62 are illustrated in the drawings) by means (not shown) known to those having ordinary skill in the art to which the invention relates, in order to provide for smooth, controlled operation of the cylinder. In the alternative, cylinder 60 could be replaced by a hydraulic cylinder (not shown) or other means for moving the compaction assembly on the frame and for applying compressive pressure through such assembly to the mixture in the mold.

Figure 1A:
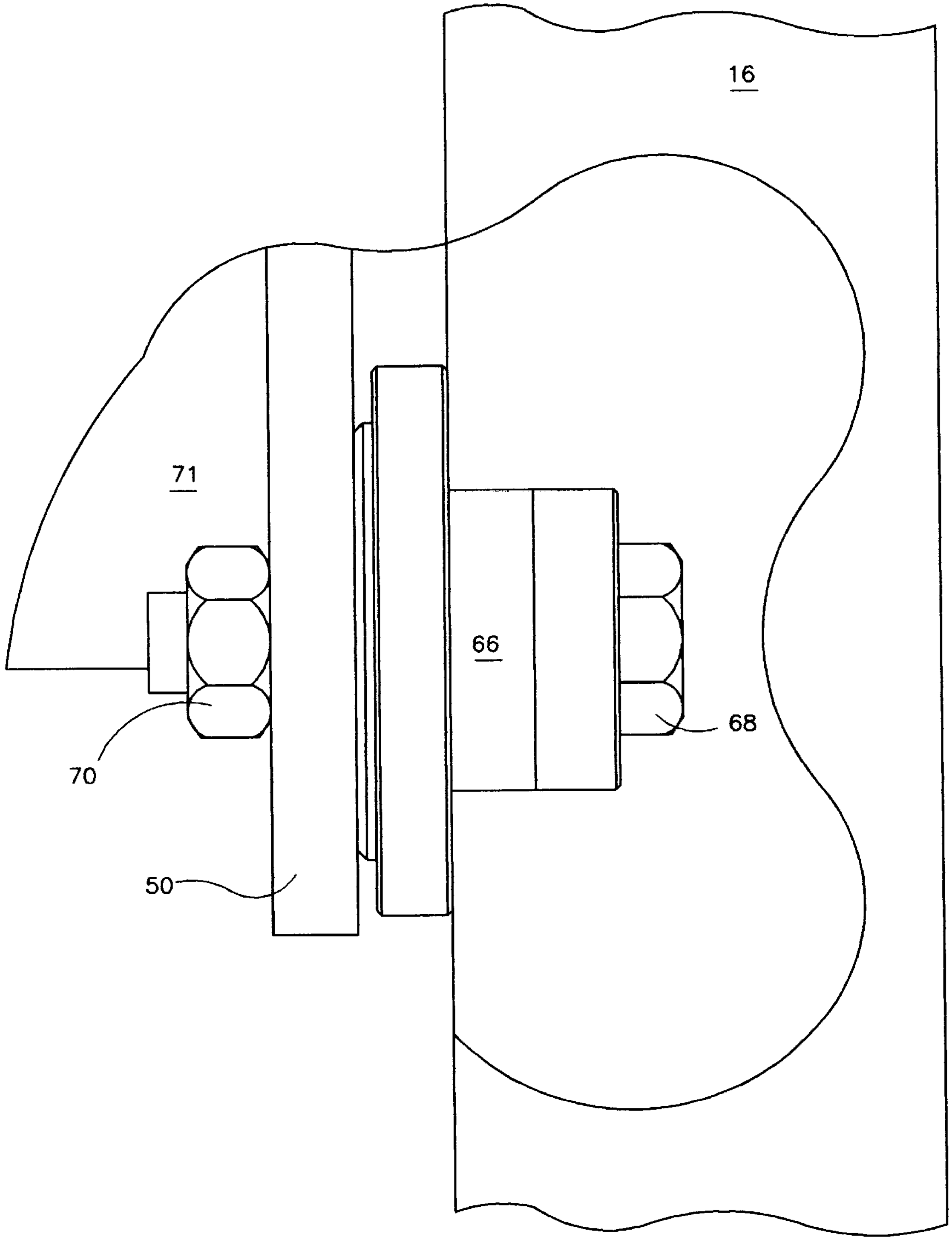
FIG. 1A is an enlarged view of a portion of the apparatus of FIG. 1.

As shown in FIG. 1A, each roller assembly includes a roller 66, which is mounted on axle bolt 68, which is secured to the carriage side rail with nut 70. Preferably, the rollers are comprised of metal or ultra-high molecular weight (UHMW) plastic, although other materials may also be used, as is known to those having ordinary skill in the art to which the invention relates. In the alternative, other known means of facilitating movement of the carriage assembly within frame 12 could also be employed.

Compaction assembly 36 is mounted on carriage assembly 46 by a pair of elastomeric isolators 71, which are located between side rail 48 and support component 72 of base plate 44 as shown at the left side of FIG. 1, and between side rail 50 and support component 73 of base plate 44 as shown at the right side of FIG. 1. Flange 74 of support component 73, which provides additional support for base plate 44, is visible in FIG. 2. Isolators 71 are adapted to isolate the vibrations created by vibrator 42 from the carriage assembly, and to assist in concentrating such vibrations on the compaction head. These isolators will also assist elstomeric pads 35 in insuring that vibrations created by vibrator 42 will not be transmitted through the base of the apparatus to the floor.

As shown in FIGS. 1 and 2, rectangular compaction head 38A is threaded to receive bolts 75 that are attached, using nuts 76, to mounting plate 78, which in turn is bolted to base plate 44 and separated therefrom by means of a plurality of spacers 80. Preferably, attachment bolts 75 and spacers 80 are provided of a sufficient length to permit the compaction head to be mounted at various incremental distances from mounting plate 78, depending on the depth of compaction required.

The preferred embodiment illustrated in the drawings is adaptable for production of specimens of various shapes and sizes. The most commonly used specimens, however, are rectangular beam specimens and cylindrical specimens, and molds for production of specimens of such shapes are illustrated in FIGS. 5 through 9. Beam-shaped specimens may be used to test asphalt compositions for various tendencies, including fatigue, rutting and stripping, while cylindrical-shaped specimens are generally used in testing for rutting and stripping tendencies. Typical beam-shaped specimens are about 125 mm wide and about 300 mm long, and typical cylindrical-shaped specimens are about 150 mm in diameter. Good results are generally obtained from production of specimens that are compacted to a height of about 75 mm.

Figure 3:
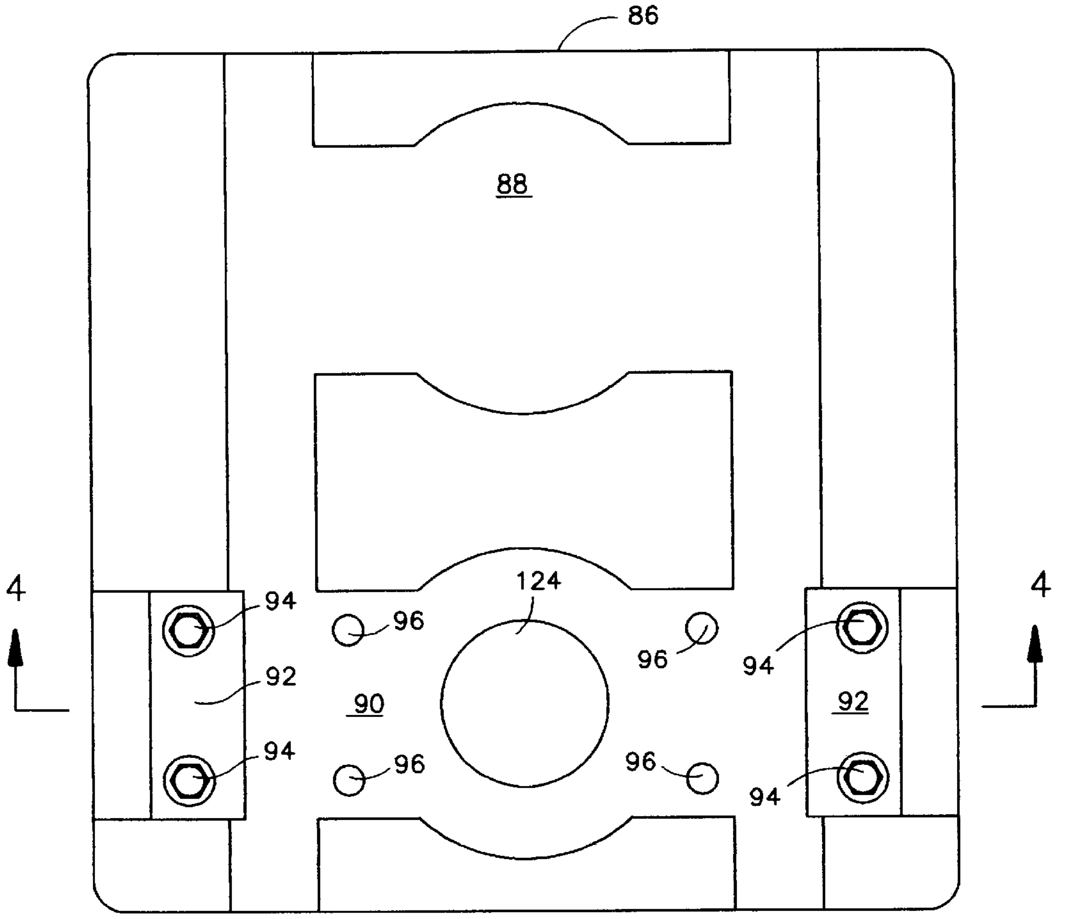
FIG. 3 is a top view of the mold base plate that is adapted to support the mold and to locate it in proper position for operation of the apparatus of FIG. 1.
Figure 4:
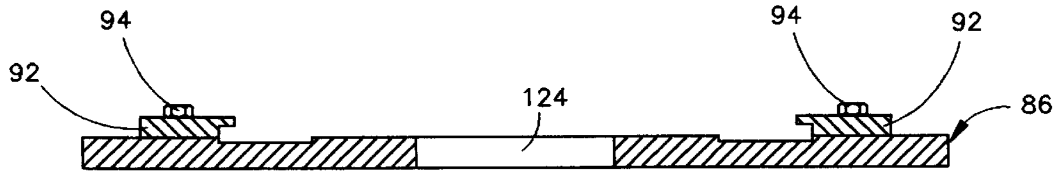
FIG. 4 is a sectional view of the mold base plate of FIG. 3, taken along the line 4—4 of FIG. 3.

Located on frame member 20 is mold support 82, comprised of a pair of support frame members 84 and a mold support base 86. Preferably, the support base 86 is provided with a pair of mold recesses 88 and 90 (see FIG. 3) that permit the mold to be placed in the proper position for operation of the sample compacting apparatus 10. Referring now to FIG. 3, support base 86 is shown with mold recess 88 that is configured to support the base of either a rectangular or a cylindrical mold in the compaction position. Recess 90 is similarly configured to support the base of molds of such shape in the sample ejection position, as will be subsequently explained. Of course, the mold recesses could be configured to support molds of any convenient shape in a similar manner to that illustrated. As shown in FIGS. 3 and 4, the molds can be further secured in position in recess 90 with a pair of mold stops 92. The mold stops are provided with bolts 94 which are adapted to be placed into holes (not shown) in the support base that are positioned for rectangular molds, or into holes 96 in the support base, which are positioned for cylindrical molds, and secured with nuts (not shown). The mold stops fit over exterior ledges on the bases of the molds, as shown in FIG. 1, so as to secure the molds in place at the ejection position.

Figure 5:
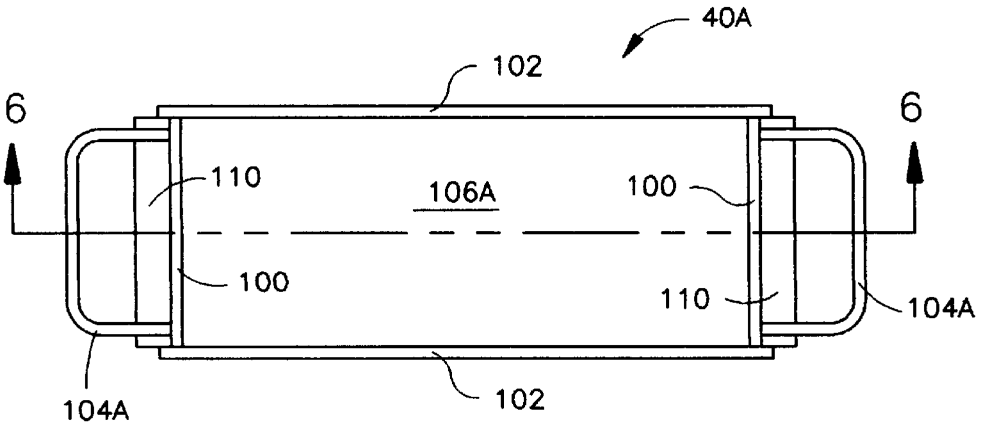
FIG. 5 is a top view of a rectangular mold that is suitable for use in connection with the apparatus of FIG. 1.
Figure 6:
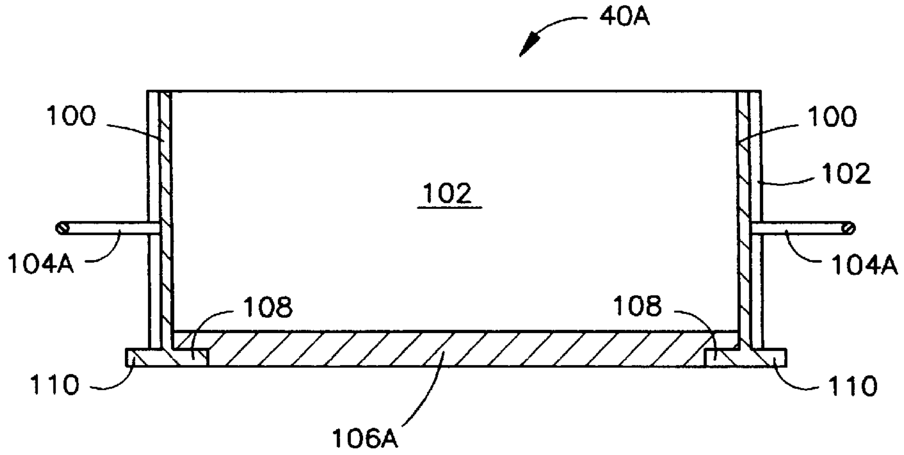
FIG. 6 is a sectional view of the rectangular mold of FIG. 5, taken along the line 6—6 of FIG. 5.
Figure 7:
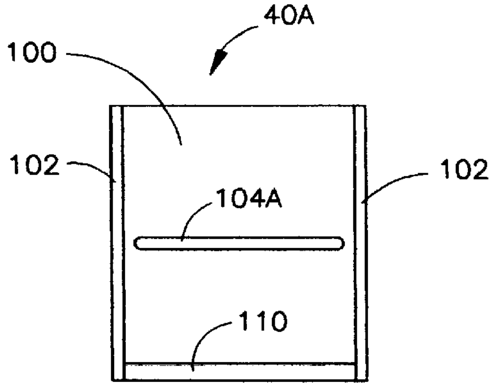
FIG. 7 is an end view of the rectangular mold of FIGS. 5 and 6.

Referring now to FIGS. 5 through 7, a rectangular mold that is suitable for use in connection with apparatus 10 is illustrated. Mold 40A includes a pair of end walls 100 and a pair of sidewalls 102, which are joined together by welding or other suitable and convenient method to form a mold body. To each of the end walls is attached (by welding or other suitable means) a handle 104A. Mold base plate 106A is adapted to fit inside the mold body and is supported by inside ledges 108 at the bottom of end walls 100. The mold base plate is not permanently affixed to the mold body, so that it may be used to eject the compacted specimen from the mold. End walls 100 are also provided with outside ledges 110, which are adapted to cooperate with the mold stops 92 so that the mold may be held securely in place on base plate 86 at the ejection position.

Figure 8:
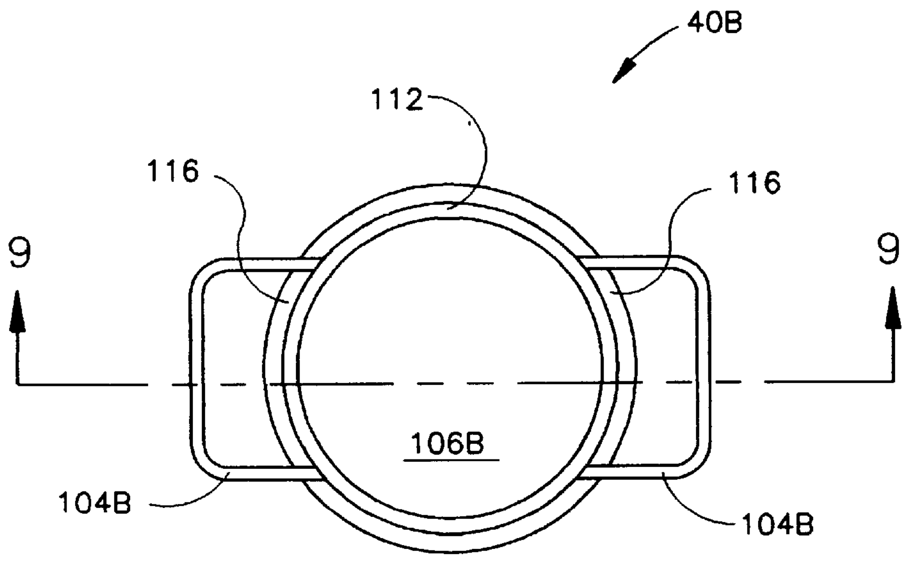
FIG. 8 is a top view of a cylindrical mold that is suitable for use in connection with the apparatus of FIG. 1.
Figure 9:
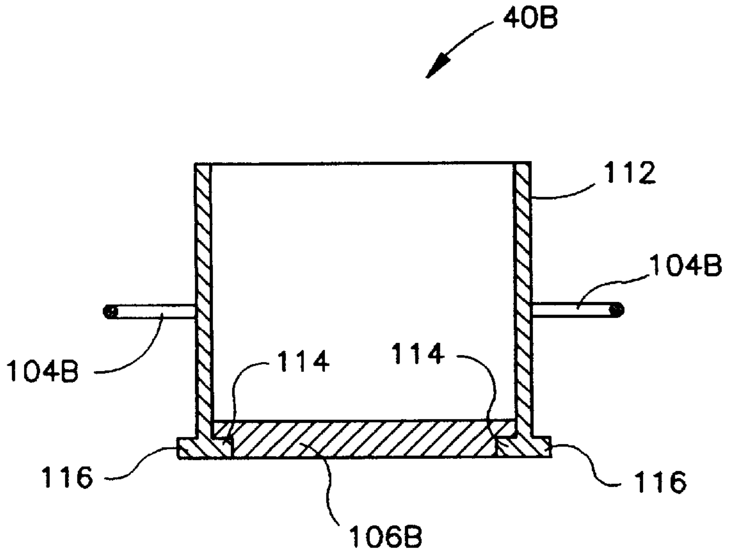
FIG. 9 is a sectional view of the cylindrical mold of FIG. 8, taken along the line 9—9 of FIG. 8.

Referring now to FIGS. 8 and 9, a cylindrical mold that is suitable for use in connection with apparatus 10 is illustrated. Mold 40B includes a cylindrical mold body 112, to which are attached (by welding or other suitable means) a pair of handles 104B. Mold base plate 106B is adapted to fit inside the mold body and is supported by inside ledges 114 at the bottom of mold body 112. The mold base plate is not permanently affixed to the mold body, so that it may be used to eject the compacted specimen from the mold. Mold body 112 is also provided with outside ledges 116, which are adapted to cooperate with the mold stops 92 so that the mold may be held securely in place on support base 86 at the ejection position.

Figure 10:
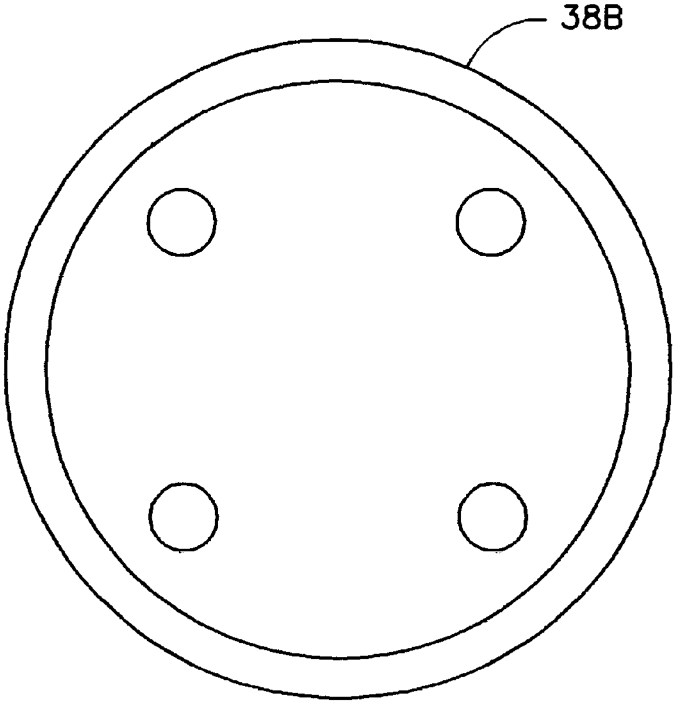
FIG. 10 is an end view of an alternative compaction head that may be used in connection with the apparatus of FIG. 1 and the cylindrical mold of FIGS. 8 and 9.
Figure 11:
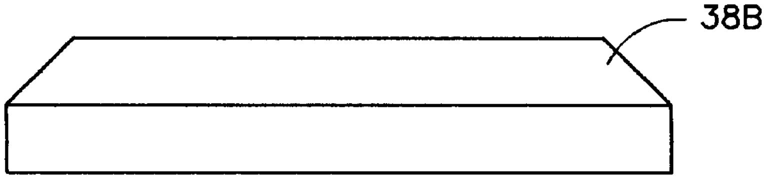
FIG. 11 is a side view of the compaction head of FIG. 10.

FIGS. 10 and 11 illustrate an alternative compaction head 38B that may be used in connection with the apparatus of FIG. 1 and the cylindrical mold of FIGS. 8 and 9. As shown therein, head 38B, like compaction head 38A, is threaded to receive bolts 76 that are attached to mounting plate 78, which in turn is bolted to base plate 44 and separated therefrom by means of a plurality of spacers 80. Compaction heads of any convenient shape may be utilized according to a practice of the invention, provided that such heads are compatible with the molds in use.

Apparatus 10 also includes an ejection assembly for use in ejecting from the mold a compacted sample that has been prepared according to the claimed method. As shown in FIGS. 1 and 2, ejection cylinder 118 is provided for ejecting a compacted sample of asphalt concrete from a mold. Good results have been obtained when the ejection cylinder used is the model AS-MF1 pneumatic cylinder having a 3.25 inch bore and an 8 inch stroke, that is manufactured and sold by AIR-DRO Company of Decatur, Ala. Cylinder 118 is preferably mounted onto frame member 20 and its actuator 120 is attached to mold ejection plate 122. Preferably, cylinder 118 is also operatively attached to one of the air-over-oil reservoirs 62 (the one not attached to cylinder 60) by means (not shown) known to those having ordinary skill in the art to which the invention relates, in order to provide for smooth, controlled operation of the cylinder. In the alternative, cylinder 118 could be replaced by a hydraulic cylinder (not shown) or other means for ejecting the compacted sample from a mold. When mold 40A is placed in recess 90 of mold support base 86 and secured thereto with mold stops 92, operation of ejector 118 may be initiated to raise the mold ejection plate through hole 124 in mold support base 86 (see FIGS. 3 and 4) to contact with the lower side of mold base plate 106A. As the mold ejection plate continues to rise, it pushes the base plate upward, with the sample thereon, so as to eject the sample out of the mold body. Preferably, the lower side of the mold base plate is provided with a recess which is adapted to mate with the mold ejection plate 122, although such preferred feature is not illustrated in the drawings.

When it is desired to use the apparatus to compact a sample specimen of an asphalt concrete mixture, the appropriate weights of aggregate, asphalt binder and other admixtures required should first be calculated. An approved calculation procedure in the State of Georgia is set out in "Georgia DOT GDT-115 Procedure", which is published by the Georgia Department of Transportation. Once the amounts of the various components of the mixture are determined, it is recommended that a mechanical mixer be employed to prepare the batch of hot mix asphalt required for the specimen. After mixing, the loose asphalt mixture should be cured and aged according to appropriate specifications prior to compaction.

The mold should then be assembled from the mold body and the mold base, and a predetermined quantity of the mixture placed therein. It is preferred to apply a lubricant to the base plate, the inside sidewalls of the mold body and the compaction head before the mixture is placed therein.

The appropriate compaction head should be attached to mounting plate 78 at a desired depth position, and the attachment should be checked to insure that the head is level. It is preferred that the mixture be heated before compaction to a temperature comparable to that at which the asphalt concrete is expected to be compacted in the field. Generally, it is desirable to heat the mixture to a temperature of at least about 275° F., and preferably, the mixture will be heated in the mold, using an oven or a heating tape. It may also be acceptable, if heating is desired, to heat the mixture by any convenient means prior to placement thereof in the mold.

The controls (not shown) should be adjusted to provide the desired compressing pressure and vibration time. The compressing pressure is a measure of the compaction force applied to the mixture in the mold through the compaction head upon actuation of pneumatic cylinder 60. The vibration time is the time that vibrator 42 is operated to apply vibration to the mixture in the mold, through base plate 44, mounting plate 78 and compaction head 38. Applicants have found that it is necessary to apply a static compressive force or compressing pressure of at least about 7 psi, and preferably about 7–28 psi, to the mixture in the mold. Such compressing pressure should be applied in a direction substantially perpendicular to the base plate of the mold. As the static compressive force is applied, the vibrator is operated to vibrate the mixture in the mold at a rate of at least about 2400 cycles per minute, and preferably at a rate of about 2400–4800 cycles per minute. Preferably, the vibrator will operate to apply a series of forces to the mixture in the mold in a direction along a line that is substantially parallel to the direction of application of the compressing pressure or static compressive force. In addition, it is also preferred that the amplitude of the vibratory forces applied by the vibrator be within the range of about 0.4–0.8 mm.

The vibration of the mixture in the mold and the application of compressing pressure thereto is maintained until the mixture obtains a predetermined mix design density within a range of about 90–97%. Applicants have found that the simultaneous application of compression and vibration according to their claimed method simulates the action of vibratory compaction rollers in the construction of asphalt concrete roadways using modern construction techniques.

Calculations may be made to determine the length of stroke of actuator 64 of compaction cylinder 60 that is necessary to achieve the desired design density for a given mix, or in the alternative, means may be provided for sensing when said mix design density is obtained.

Generally, such density can be achieved when the compressing pressure and the vibration of the mixture in the mold are maintained for at least about 10 seconds, and preferably for a time within a range of about 10–30 seconds. Preferably, apparatus 10 is provided with means for an automatic mode of operation, including a limit switch (not shown) on cylinder 60 to activate vibrator 42 just as or just before the compaction head contacts the mixture of asphalt concrete in the mold. It is preferred that the apparatus be provided with appropriate limit switches and controls, such as are known to those having ordinary skill in the art to which the invention relates, that after a mold containing a predetermined quantity of an asphalt concrete mixture is placed in the compaction position, the device may be activated and compaction will proceed until the desired mix design density is obtained.

After the sample is compacted, pneumatic cylinder 60 may be reversed to remove the compaction head from the mold, and the mold may be moved from the compaction position to the ejection position. Mold stops 92 may be attached to mold support base 86 to hold the mold securely in position, so that an ejecting force may be applied to the base plate of the mold by cylinder 118 to eject the specimen from the mold. Preferably, this ejecting force is applied along a line substantially parallel to the direction of application of the static compressive force.

Although this description contains many specifics, these should not be construed as limiting the scope of the invention but as merely providing illustrations of some of the presently preferred embodiments thereof, as well as the best mode contemplated by the inventors of carrying out their invention. The invention, as described herein, is susceptible to various modifications and adaptations, and the same are intended to be comprehended within the meaning and range of equivalents of the appended claims.

What is claimed is:

1. A method for forming a test specimen from an asphalt concrete mixture, which method comprises:

(a) providing a mold to receive a quantity of the mixture, the mold having a mold body and a mold base;

(b) adding a predetermined quantity of the mixture to the mold;

(c) compressing the mixture in the mold by applying a static compressive force to the mixture in a direction substantially perpendicular to the mold base at a pressure of at least about 7 psi while vibrating the mixture in the mold at a rate of at least about 2400 cycles per minute;

(d) maintaining the vibration of and the application of compressing pressure to the mixture in the mold until the mixture obtains a predetermined mix design density within a range of about 90–97%.

2. The method of claim 1 which includes compressing the mixture in the mold at a pressure within a range of about 7–28 psi.

3. The method of claim 1 which includes vibrating the mixture in the mold at a rate within the range of about 2400–4800 cycles per minute.

4. The method of claim 1, wherein the vibration of the mixture in the mold is maintained for at least about 10 seconds.

5. The method of claim 1 which includes heating the mixture in the mold.

6. The method of claim 5, wherein the mixture is heated to a temperature of at least about 275° F.

7. The method of claim 1 which includes vibrating the mixture in the mold by applying a series of forces in a direction that is generally parallel to the direction of application of the static compressive force.

8. The method of claim 7, wherein the mixture in the mold is vibrated by application of vibratory forces having an amplitude within a range of about 0.4–0.8 mm.

9. A method for forming a test specimen from a mixture of asphalt concrete which comprises:

(a) providing a mold body having sidewalls;

(b) providing a base plate that is adapted to form a floor for the mold body so that the mold body and the base plate together comprise a mold;

(c) providing a compaction head that is adapted to fit within the sidewalls of the mold body, and which is adapted to apply a static compressive force to a quantity of the mixture in the mold;

(d) heating the base plate and the mold body;

(e) applying a lubricant to the base plate, an inside surface of the sidewalls of the mold body and the compaction head;

(f) placing the base plate within the mold body to form the mold;

(g) placing a predetermined quantity of the mixture in the mold;

(h) activating the compaction head to apply a static compressive force of at least about 7 psi to the mixture in the mold in a direction substantially perpendicular to the base plate;

(i) applying a series of vibratory forces to the mixture in the mold at a rate of at least about 2400 cycles per minute along a line substantially parallel to the direction of application of the static compressive force;

(j) maintaining the application of the vibratory forces and the application of the static compressive force to the mixture in the mold until the mixture obtains a predetermined mix design density within a range of about 90–97%;

(k) removing the compaction head from the mold; and (l) applying an ejecting force to the base plate along a line substantially parallel to the direction of application of the static compressive force to eject the specimen from the mold.

10. The method of claim 9 which includes applying the static compressive force within a range of about 7–28 psi.

11. The method of claim 9 which includes applying the vibratory forces to the mixture in the mold at a rate within a range of about 2400–4800 cycles per minute.

12. The method of claim 9, wherein the vibratory forces are applied to the mixture in the mold for at least about 10 seconds.

13. The method of claim 9, wherein the mixture in the mold is vibrated by application of vibratory forces having an amplitude within the range of about 0.4–0.8 mm.

14. The method of claim 9 which includes preheating the mold and the quantity of the mixture and placing the mixture in the mold.

15. The method of claim 14, wherein the mixture is heated to a temperature of at least about 275° F.

* * * * *